United States Patent [19]
Yoneda

[11] Patent Number: 6,128,428
[45] Date of Patent: Oct. 3, 2000

[54] SINGLE-TYPE ARRAY OPTICAL CONVERSION APPARATUS

[75] Inventor: Isao Yoneda, Tokyo, Japan

[73] Assignee: NEC Corporation, Tokyo, Japan

[21] Appl. No.: 09/175,989

[22] Filed: Oct. 21, 1998

[30] Foreign Application Priority Data

Oct. 22, 1997 [JP] Japan ................................ 9-289980

[51] Int. Cl.$^7$ .................................................. G02B 6/30
[52] U.S. Cl. ................................................ 385/49; 385/89
[58] Field of Search ................................ 385/39, 49, 48, 385/52, 59, 65, 83, 89

[56] References Cited

U.S. PATENT DOCUMENTS

| | | | |
|---|---|---|---|
| 5,123,068 | 6/1992 | Hakoun et al. | 385/14 |
| 5,481,632 | 1/1996 | Hirai et al. | 385/49 |
| 5,579,112 | 11/1996 | Sugiyama et al. | 356/360 |
| 5,600,745 | 2/1997 | Wuu et al. | 385/49 |
| 5,696,860 | 12/1997 | Semura et al. | 385/49 |
| 5,848,210 | 12/1998 | Kimura | 385/89 |
| 6,058,234 | 5/2000 | Tachigori | 385/79 |

FOREIGN PATENT DOCUMENTS

| | | |
|---|---|---|
| 6-342113 | 12/1994 | Japan . |
| 7-5344 | 1/1995 | Japan . |
| 8-204213 | 8/1996 | Japan . |
| 8-313744 | 11/1996 | Japan . |
| 9-61676 | 3/1997 | Japan . |

OTHER PUBLICATIONS

English translation of Japanese Office Action dated Apr. 27, 1999 (Hei 11).

*Primary Examiner*—John D. Lee
*Assistant Examiner*—Sarah U. Song
*Attorney, Agent, or Firm*—McGuire Woods

[57] ABSTRACT

A single-type array optical conversion apparatus includes a substrate and an optical waveguide. The substrate has a rectangular area sandwiched by first and second end faces opposing each other. The optical waveguide is formed in the rectangular area and has a single input waveguide exposed on the first end face of the rectangular area, and a plurality of branched waveguides exposed on the second end face of the rectangular area. The optical waveguide is branched into $2^n$ by repeating branching into two waveguides from the first to second end face of the rectangular area. The input waveguide is optically connected to a single-type optical fiber, and the branched optical waveguides are optically connected to a multi-type array optical fiber.

8 Claims, 3 Drawing Sheets

SINGLE-TYPE ARRAY OPTICAL CONVERSION APPARATUS

BACKGROUND OF THE INVENTION

The present invention relates to a single-type array optical conversion apparatus and, more particularly, to a single-type array optical conversion apparatus used in optical fiber communication.

FIG. 5 shows the arrangement of a conventional optical conversion apparatus shown in Japanese Patent Laid-Open No. 8-204213. As shown in FIG. 5, this conventional optical conversion apparatus is constituted by a plurality of demultiplexers 24, a plurality of multiplexers 25, and an optical switch element array 21. The demultiplexers 24 demultiplex input light 26 from a plurality of waveguides to an optical fiber array 23. The multiplexers 25 multiplex output light 27, which is output through the optical fiber array 23, to a plurality of waveguides. The optical switch element array 21 receives the input light and makes output light emerge. In this arrangement, the plurality of waveguides connected to the input portions of the optical fibers correspond to the plurality of waveguides connected to the output portions of the optical fibers in one-to-one correspondence, and the optical paths are switched by the optical switch element array 21 in one-to-one correspondence.

The conventional optical conversion apparatus described above has the following problems.

The first problem is as follows. In the conventional optical conversion apparatus, although the optical paths from the input side to the output side can be switched in one-to-one correspondence, light which is input from one channel cannot be output to a plurality of channels on the output side simultaneously. This is because the input and output channels of the conventional optical conversion apparatus merely correspond to each other in one-to-one correspondence and a switching operation to connect one input channel to a plurality of output channels cannot be performed.

The second problem is as follows. In conventional optical conversion, when a light-receiving unit array is connected to the output side to measure the quantum efficiency, light sources corresponding in number to the channels must be arranged on the input side. If the number of light sources is one, the optical connector must be attached/detached every time the optical path is to be switched, or the path must be switched, leading to poor operability. This is because the input and output channels of the conventional optical conversion apparatus merely correspond to each other in one-to-one correspondence and a switching operation to connect one input channel to a plurality of output channels cannot be performed.

The third problem is as follows. In the conventional optical conversion apparatus, since variations occur in connection loss upon attaching/detaching the optical connector, the output is unstable. This is because, regarding the single-type connector loss on the input side, every time the output channel is switched, the loss caused by attachment/detachment of the optical connector varies.

SUMMARY OF THE INVENTION

It is an object of the present invention to provide a single-type array optical conversion apparatus which can branch and output light, which has come incident on a single-type optical fiber, to the respective channels of a multi-type array optical fiber simultaneously.

It is another object of the present invention to provide a single-type array optical conversion apparatus which uses a single light source to simplify the apparatus arrangement.

It is still another object of the present invention to provide a single-type array optical conversion apparatus which does not require attachment/detachment of the connector on the input side and a path switching operation to improve the reliability.

It is still another object of the present invention to provide a single-type array optical conversion apparatus which does not require attachment/detachment in units of channels to improve the operability.

It is still another object of the present invention to provide a single-type array optical conversion apparatus in which measurement time is reduced to improve the productivity.

In order to achieve the above objects, according to the present invention, there is provided a single-type array optical conversion apparatus comprising a substrate having a rectangular area sandwiched by first and second end faces opposing each other, and an optical waveguide formed in the rectangular area and having a single input waveguide exposed on the first end face of the rectangular area and a plurality of branched waveguides exposed on the second end face of the rectangular area, the optical waveguide being branched into $2^n$ by repeating branching into two waveguides from the first to second end face of the rectangular area, and the input waveguide being optically connected to a single-type optical fiber and the branched optical waveguides being optically connected to a multi-type array optical fiber.

DESCRIPTION OF THE PREFERRED EMBODIMENTS

The present invention will be described in detail with reference to the accompanying drawings.

First Embodiment

Figure 1:
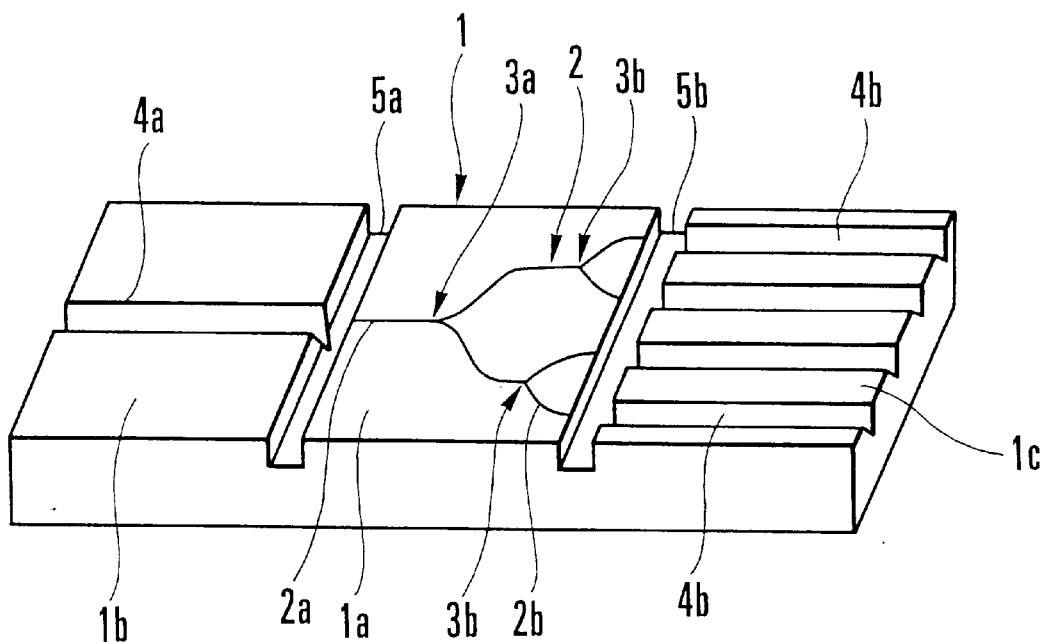
FIG. 1 is a perspective view showing the schematic arrangement of a single-type array optical conversion apparatus according to the first embodiment of the present invention.

FIG. 1 shows the schematic arrangement of a single-type array optical conversion apparatus according to the first embodiment of the present invention. In the single-type array optical conversion apparatus of this embodiment, as shown in FIG. 1, two rectangular grooves 5a and 5b parallel to each other at a predetermined distance from each other are formed in a rectangular, flat substrate 1 having a predetermined thickness in a direction perpendicularly intersecting the longitudinal direction of the substrate 1. The substrate 1 is partitioned into a rectangular area 1a sandwiched by the rectangular grooves 5a and 5b, and a pair of end areas 1b and 1c outside the rectangular grooves 5a and 5b.

A single V-groove 4a is formed in the end area 1b of the substrate 1 to extend from the central portion of one rectangular groove 5a to one end face of the substrate 1 in the longitudinal direction of the substrate 1. A plurality of (four) V-grooves 4b are formed in the end area 1c to extend from the other rectangular groove 5b to the other end face of the substrate 1 in the longitudinal direction of the substrate 1. The V-groove 4a opens in one side surface of the rectangular groove 5a, and the V-grooves 4b open in one side surface of the rectangular groove 5b.

An optical waveguide 2 is formed in the rectangular area 1a of the substrate 1. The optical waveguide 2 repeats branching into two waveguides continuously from one end face on the V-groove 4a side to one end face of the V-grooves 4b side, i.e., from one side wall of the rectangular groove 5a to one side wall of the rectangular groove 5b, such that one waveguide branches into two waveguides and then the two waveguides branch into four waveguides. More specifically, the optical waveguide 2 has one input waveguide 2a and a plurality of branched waveguides 2b obtained by branching the input waveguide 2a at least once.

In this embodiment, since the four V-grooves 4b are formed, one input waveguide 2a on the V-groove 4a side which is connected to the rectangular groove 5a is branched into two waveguides at a first-stage optical branching portion 3a, and these two waveguides are further branched into the four V-grooves 4b at a next-stage optical branching portion 3b. The cores of the input waveguide 2a and branched waveguides 2b respectively facing the rectangular grooves 5a and 5b are set at positions corresponding to the V-grooves 4a and 4b, respectively.

Figure 2:
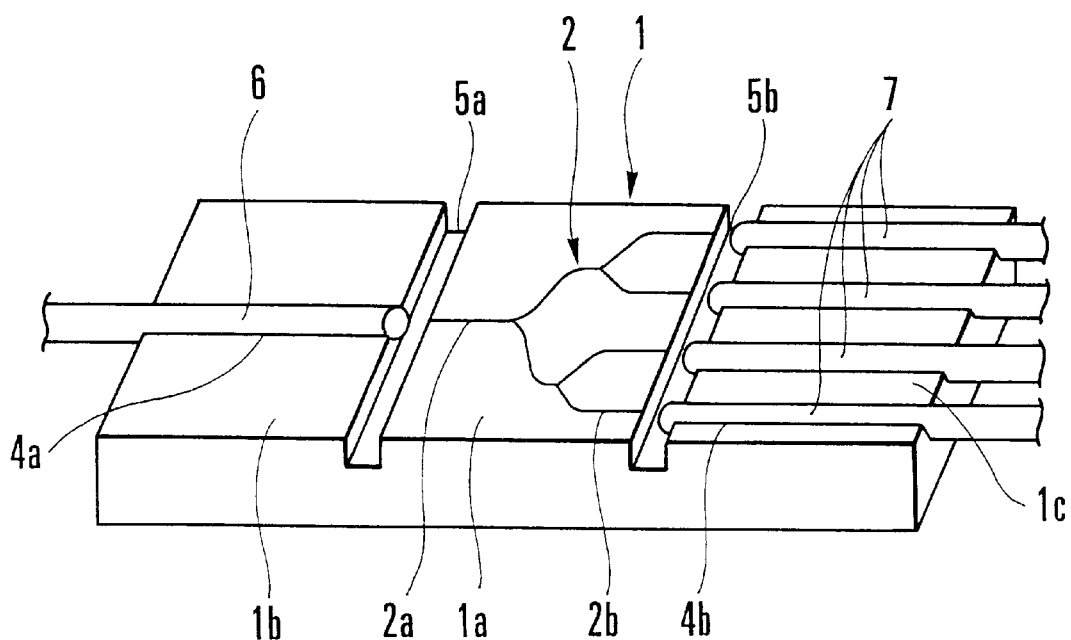
FIG. 2 shows a state wherein optical fibers are connected to two ends of the single-type array optical conversion apparatus shown in FIG. 1.

FIG. 2 shows a state wherein optical fibers are connected to the two ends of the single-type array optical conversion apparatus having the arrangement as shown in FIG. 1. As shown in FIG. 2, the fiber end of a single-type optical fiber 6 is mounted in the V-groove 4a on one end side of the single-type array optical conversion apparatus, and the respective fiber ends of a multi-type array optical fiber 7 having four fibers are mounted in the V-grooves 4b on the other end side of the single-type array optical conversion apparatus.

This multi-type array optical fiber 7 is also called a ribbon fiber. The cores of the respective optical fibers 6 and 7 are arranged to coincide with the cores of the branched waveguides 2b. Since the grooves for mounting the fiber ends of the single-type optical fiber 6 and multi-type array optical fiber 7 are formed to have V shapes, these fiber ends can be mounted on the substrate 1 at high precision.

In this arrangement, light that has come incident from the end area 1b of the substrate 1 formed with the V-groove 4a through the single-type optical fiber 6 enters the optical waveguide 2 in the rectangular area 1a through the rectangular groove 5a. Light that has come incident on the optical waveguide 2 is branched at the first-stage input waveguide 2a. The branched light beams are further branched at the next branched waveguides 2b and emerge from the end area 1c of the substrate 1 formed with the V-grooves 4b through the multi-type array optical fiber 7.

Second Embodiment

Figure 3:
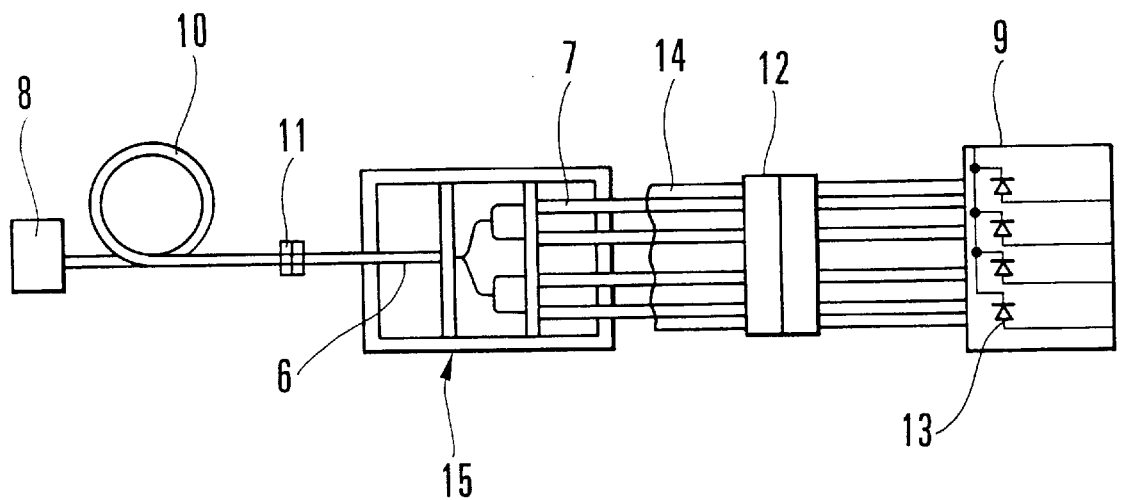
FIG. 3 is a plan view showing the schematic arrangement of a single-type array optical conversion apparatus according to the second embodiment of the present invention.

FIG. 3 shows the schematic arrangement of a single-type array optical conversion apparatus according to the second embodiment of the present invention. As shown in FIG. 3, the single-type array optical conversion apparatus of this embodiment is obtained by connecting a light source and a light-receiving unit to the two sides of the single-type array optical conversion apparatus shown in FIG. 2.

More specifically, in FIG. 3, the input side of a single-type optical fiber 6 of a single-type array optical conversion apparatus 15 is connected to a pigtail cord 10, which guides light from a light source 8, through a single-type optical connector 11. The output side of a multi-type array optical fiber 7 of the single-type array optical conversion apparatus 15 is covered with an optical fiber primary coating 14 and connected to a plurality of (four) light-receiving elements 13 that constitute a light-receiving unit 9. The multi-type array optical fiber 7 can be disconnected from the light-receiving unit 9 through an array optical connector 12.

In this arrangement, light emerging from the light source 8 is equally branched into four light beams by the single-type array optical conversion apparatus 15, and the four light beams become incident on the corresponding light-receiving elements 13 of the light-receiving unit 9.

Third Embodiment

Figure 4:
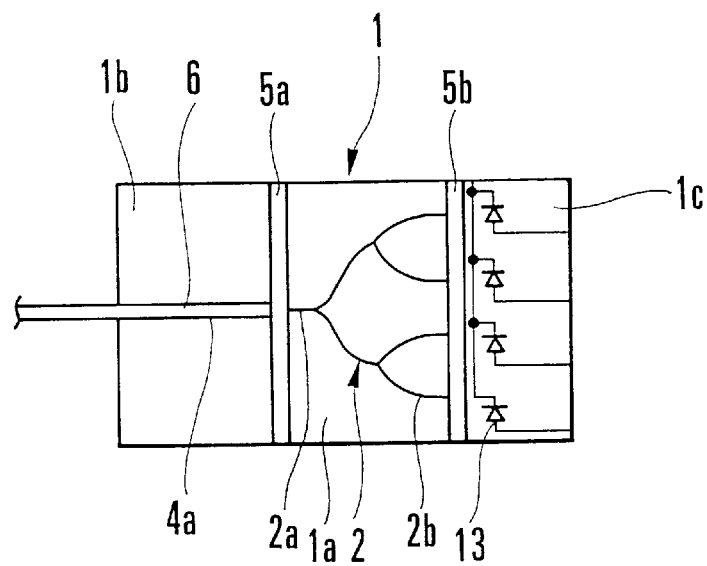
FIG. 4 is a plan view showing the schematic arrangement of a single-type array optical conversion apparatus according to the third embodiment of the present invention.
Figure 5:
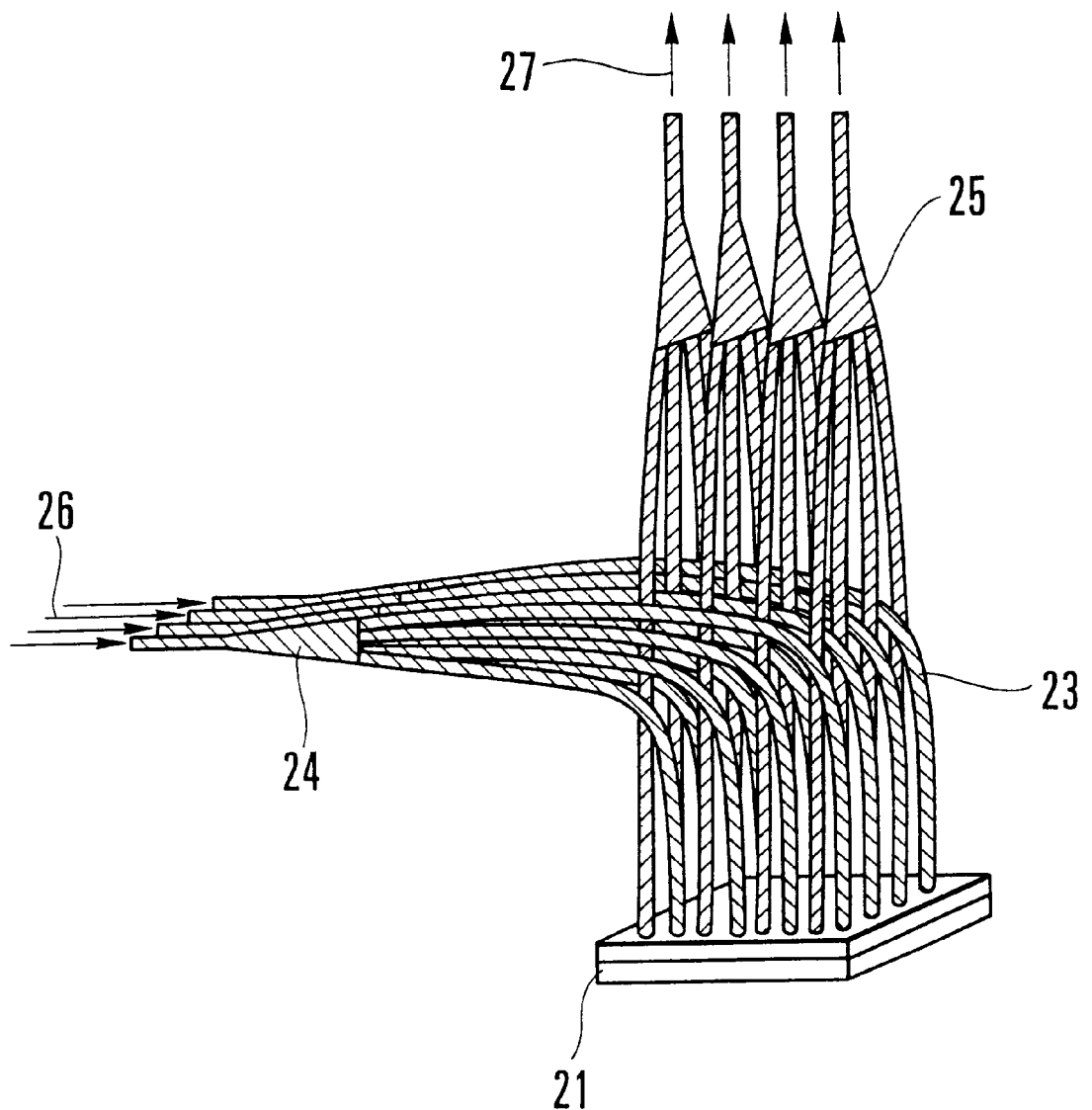
FIG. 5 is a perspective view showing the arrangement of a conventional optical conversion apparatus.

FIG. 4 shows the schematic arrangement of a single-type array optical conversion apparatus according to the third embodiment of the present invention. As shown in FIG. 4, in the single-type array optical conversion apparatus of this embodiment, light-receiving elements 13 are arranged on the output side of four branched waveguides 2b. This embodiment shows a case wherein the light-receiving elements 13 are of the end-face incident type. When surface incident type light-receiving elements are to be arranged, they may be mounted on a substrate 1 such that their light-receiving surfaces face upward, and an optical system including a reflection mirror may be arranged to bend light emerging from the end faces of an optical waveguide 2.

With this arrangement as well, light that come incident on the end face of an input waveguide 2a through a single-type optical fiber 6 is equally branched into the plurality of branched waveguides 2b, and the branched light beams come incident on the corresponding light-receiving elements 13.

According to the above embodiments, light that has come incident on the single-type optical fiber is branched and output to the respective channels of a multi-type array optical fiber simultaneously. Therefore, a plurality of light sources are not required, and light from a single light source can be extracted from a plurality of outputs simultaneously, thereby simplifying the apparatus arrangement. Since attachment/detachment of the connector on the input side and a path switching operation are not required, the output always becomes constant to lead to an improvement in reliability.

Since a path switching operation can be performed by only exchanging the single-type array conversion optical circuit itself once, attachment/detachment of the connector in units of channels becomes unnecessary to lead to an improvement in operability. Since attachment/detachment of the connector in units of channels becomes unnecessary, a measurement time can be shortened.

The present invention that has been described above has effects as follows.

The first effect is that a plurality of light sources are not required and light from a single light source can be derived from a plurality of outputs simultaneously. This is because a single-type optical fiber and a multi-type array optical fiber are cascade-connected through the optical waveguides.

The second effect is that each of a plurality of outputs can always be set constant. This is because since attachment/detachment of the connector on the input side is unnecessary, variations in output accompanying a path switching operation are small.

The third effect is that attachment/detachment of an optical connector each time a path switching operation is performed becomes unnecessary, and a measurement time can be shortened. This is because light can be transmitted to a plurality of channels simultaneously and accordingly a switching operation is not necessary.

What is claimed is:

1. A single-type array optical conversion apparatus comprising:
    a substrate having a rectangular area sandwiched by first and second end faces opposing each other;
    an optical waveguide formed in the rectangular area and having a single input waveguide exposed on the first end face of the rectangular area and a plurality of branched waveguides exposed on the second end face of the rectangular area, the optical waveguide being branched into $2^n$ by repeating branching into two waveguides from the first to second end face of the rectangular area, and the input waveguide being optically connected to a single-type optical fiber; and
    a plurality of light-receiving elements mounted on said substrate and optically connected to the branched waveguides.

2. An apparatus according to claim 1, wherein said apparatus further comprises two rectangular grooves formed in said substrate to be parallel to each other at a predetermined distance from each other, and
    an area on said substrate which is sandwiched by the rectangular grooves is used as the rectangular area.

3. An apparatus according to claim 2, wherein
    said substrate has first and second end areas outside the rectangular grooves,
    the single-type optical fiber is mounted on the first end area and optically connected to a core of the input waveguide exposed on the first end face of the rectangular area, and
    the multi-type array optical fiber is mounted on the second end area and optically connected to cores of the branched waveguides exposed on the second end face of the rectangular area.

4. An apparatus according to claim 3, further comprising
    a first V-groove formed in the first end area to mount the single-type optical fiber therein, and
    a plurality of second V-grooves formed in the second end area to mount the multi-type array optical fiber therein.

5. An apparatus according to claim 1, further comprising:
    two parallel, rectangular grooves formed in said substrate, and wherein
        said substrate has first and second end areas outside the rectangular grooves, and
        the single-type optical fiber is mounted on the first end are and optically connected to a core of the input waveguide exposed on the first end face of the rectangular area.

6. An apparatus according to claim 5, wherein the light-receiving elements are mounted on the second end area and optically connected to cores of the branched waveguides, exposed on the second end face of the rectangular area, through an optical system.

7. An apparatus according to claim 1, wherein the light-receiving elements are end-face incident type light-receiving elements.

8. An apparatus according to claim 1, wherein the light-receiving elements are surface-incident type light-receiving elements.

* * * * *